United States Patent
Yamauchi et al.

(10) Patent No.: US 8,469,515 B2
(45) Date of Patent: Jun. 25, 2013

(54) ILLUMINATOR, IMAGE DISPLAY APPARATUS, AND POLARIZATION CONVERSION/DIFFUSION MEMBER

(75) Inventors: Taisuke Yamauchi, Matsumoto (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 614 days.

(21) Appl. No.: 12/255,172

(22) Filed: Oct. 21, 2008

(65) Prior Publication Data

US 2009/0161072 A1    Jun. 25, 2009

(30) Foreign Application Priority Data

Dec. 21, 2007    (JP) .................. 2007-330805

(51) Int. Cl.
*G03B 21/14*    (2006.01)
*G02B 5/30*    (2006.01)
*G02B 27/28*    (2006.01)

(52) U.S. Cl.
USPC .................. 353/20; 359/483.01; 359/489.01; 359/489.07

(58) Field of Classification Search
USPC .............. 353/7–8, 20, 94, 122; 359/483, 489, 359/483.01, 489.01, 489.07–489.08, 5, 7–9; 349/5, 7–9
See application file for complete search history.

(56) References Cited

U.S. PATENT DOCUMENTS

| | | | | |
|---|---|---|---|---|
| 6,188,524 B1 * | 2/2001 | Hayashi et al. | ............... | 359/651 |
| 7,023,602 B2 * | 4/2006 | Aastuen et al. | ............... | 359/247 |
| 7,152,977 B2 * | 12/2006 | Ruda et al. | ............... | 353/37 |
| 7,271,962 B2 * | 9/2007 | Kasazumi et al. | ............ | 359/707 |
| 7,320,521 B2 * | 1/2008 | Mihalakis | ............... | 353/20 |
| 7,399,084 B2 * | 7/2008 | Morikawa et al. | ............... | 353/31 |
| 7,572,015 B2 * | 8/2009 | Kobayashi et al. | ........... | 353/102 |
| 2006/0023164 A1 * | 2/2006 | Sakaguchi et al. | .............. | 353/20 |
| 2006/0023165 A1 * | 2/2006 | Ishihara et al. | ................. | 353/20 |
| 2007/0153235 A1 * | 7/2007 | Morikawa et al. | .............. | 353/20 |
| 2007/0273849 A1 | 11/2007 | Takeda | | |
| 2009/0046254 A1 * | 2/2009 | De Vaan et al. | ................. | 353/30 |

FOREIGN PATENT DOCUMENTS

| | | |
|---|---|---|
| JP | A 6-208089 | 7/1994 |
| JP | A-2002-090881 | 3/2002 |
| JP | A 2005-84117 | 3/2005 |
| JP | A 2006-53495 | 2/2006 |
| JP | A-2007-279204 | 10/2007 |

OTHER PUBLICATIONS

Yasuhiro, Doi, *Polarization and Crystal Optics*, Optical Technique Series 4, Kyoritsu Shuppan Co., Ltd., Japan, Dec. 5, 1975, pp. 1-23 (with translation).

* cited by examiner

*Primary Examiner* — Tony Ko
*Assistant Examiner* — Jori S Reilly-Diakun
(74) *Attorney, Agent, or Firm* — Oliff & Berridge, PLC

(57) ABSTRACT

An illuminator that illuminates a projected surface includes a laser light source that emits laser light; a polarization converter disposed downstream of the laser light source, the polarization converter having a first area that converts the polarization direction of incident laser light into a first polarization direction and outputs the resultant laser light and a second area that converts the polarization direction of incident laser light into a second polarization direction and outputs the resultant laser light; and a light diffusion section disposed downstream of the laser light source, the light diffusion section diffusing incident laser light.

17 Claims, 13 Drawing Sheets

30 DICHROIC PRISM

ILLUMINATOR, IMAGE DISPLAY APPARATUS, AND POLARIZATION CONVERSION/DIFFUSION MEMBER

BACKGROUND

1. Technical Field

The present invention relates to an illuminator, an image display apparatus, and a polarization conversion/diffusion member.

2. Related Art

In recent years, there is widely known a projector in which an illuminator illuminates a light modulator and a projection optical system, such as a projection lens, enlarges and projects image light outputted from the light modulator on a screen.

A metal halide lamp, a halogen lamp, and other lamps have been used as the illuminator in the projector. In recent years, however, it has been proposed to use a semiconductor laser (LD) to reduce the sizes of the illuminator and the projector. Advantages of a laser light source include not only compactness but also excellent color reproducibility, image display with high brightness and contrast, and quick start.

However, since laser light is coherent, enlarged and projected image light produces a speckle pattern having bright and dark dots randomly distributed. Such a speckle pattern occurs when interference occurs between light beams that exit from various locations in a projection optical system and have randomly different phases. An image having such a speckle pattern disadvantageously gives a viewer a sense of glaring flicker.

To solve the problem, image display apparatus have been proposed in which light emitted from a light source is diffused in a diffuser plate to reduce speckle noise (see JP-A-6-208089, JP-A-2005-84117, and JP-A-2006-53495, for example).

In the display apparatus described in JP-A-6-208089, light emitted from a laser light source is diffused in a diffuser element, and the diffused light is focused by a lens onto a spatial light modulator. The light converted into an image by the spatial light modulator is then displayed on a viewing screen.

In the projection-type image display apparatus described in JP-A-2005-84117, light emitted from a one-dimensional display device is scanned by a galvanometric scanner, and the scanned light passes through an oscillating diffuser. The light is diffused in the diffuser, outputted therefrom, and enlarged and projected on a screen through a projection lens.

In the image display system described in JP-A-2006-53495, a first optical system focuses light emitted from a light source to form an intermediate image on an optical diffusion angle converter, and the optical diffusion angle converter enlarges the incidence angle of the light incident thereon and outputs the light therefrom with the enlarged exit angle. Oscillating the optical diffusion angle converter allows temporal change in speckle pattern to be integrated in human eyes and hence speckle noise to be reduced.

In the technologies described in JP-A-6-208089 and JP-A-2005-84117, however, light emitted from the light source is diffused in the diffuser plate to reduce speckle noise, but it is difficult to reduce speckle noise to a level at which human eyes cannot perceive any noise by relying only on the diffuser plate.

In the technology described in JP-A-2006-53495, optimizing the relationship between the scattering angle at the optical diffusion angle converter and the introduction angle at a projection lens allows a large number of scatter patterns to be projected on the screen, whereby a bright image with reduced speckle noise can be projected. In this configuration, again, it is difficult to reduce speckle noise to a level at which human eyes cannot perceive any noise.

SUMMARY

An advantage of some aspects of the invention is to provide an illuminator, an image display apparatus, and a polarization conversion/diffusion member capable of more reliably reducing speckle noise.

To achieve the above advantage, the invention provides the following aspects.

An illuminator according to a first aspect of the invention includes a laser light source that emits laser light, and a polarization converter having a plurality of areas that convert the laser light emitted from the laser light source into laser light beams having polarization directions that correspond to the plurality of areas and outputs the laser light beams. The illuminator diffuses the laser light emitted from the laser light source or the laser light beams that exit from the polarization converter and illuminates a projected surface.

In the illuminator according to the first aspect of the invention, laser light emitted from the laser light source is, for example, incident on the polarization converter and then diffused. That is, laser light beams having converted polarization directions that correspond to the areas are diffused. Since laser light beams having different polarization directions do not interfere with each other, the projected surface can be illuminated with laser light with reduced speckle noise.

The illuminator according to the first aspect of the invention preferably further includes a projection device that projects diffused laser light or laser light beams that exit from the polarization converter on the projected surface.

In the illuminator according to the first aspect of the invention, the projection device projects diffused laser light or laser light beams that exit from the polarization converter on the projected surface. Using such an illuminator in a laser machining apparatus or a laser exposure apparatus allows the projected surface to be irradiated with laser light with reduced speckle noise, whereby laser machining or laser exposure can be accurately performed.

An image display apparatus according to a second aspect of the invention includes a laser light source that emits laser light, a polarization converter having a plurality of areas that convert the laser light emitted from the laser light source into laser light beams having polarization directions that correspond to the plurality of areas and outputs the laser light beams, a light modulator that modulates the laser light emitted from the laser light source in accordance with an image signal, and a projection device that projects the laser light modulated by the light modulator on a projected surface to diffuse the laser light emitted form the laser light source and project it on the projected surface.

In the image display apparatus according to the second aspect of the invention, the laser light emitted from the laser light source is modulated by the light modulator in accordance with an image signal, and the modulated laser light is projected through the projection device on the projected surface. In this process, the laser light to be projected on the projected surface is, for example, modulated by the light modulator, incident on the polarization converter, and then diffused. That is, the image that exits from the light modulator undergoes polarization direction conversion and diffusion in the areas of the polarization converter. The diffused laser light beams having different polarization directions are then projected on the projected surface. Since laser light beams having different polarization directions do not interfere with each other, speckle noise in the image projected on the projected surface can be reduced.

In the image display apparatus according to the second aspect of the invention, it is preferable that the polarization converter has depressions formed therein and the depressions diffuse the laser light emitted from the laser light source.

In the image display apparatus according to the second aspect of the invention, since the polarization converter has depressions formed therein and the depressions diffuse the laser light emitted from the laser light source, the size and the cost of the overall apparatus can be reduced.

The image display apparatus according to the second aspect of the invention preferably further includes a light diffusion section that diffuses the laser light emitted from the laser light source.

In the image display apparatus according to the second aspect of the invention, the light diffusion section diffuses the laser light emitted from the laser light source or the laser light beams that exit from the polarization converter. That is, providing the light diffusion section allows laser light to be more reliably diffused, whereby speckle noise in an image projected on the projected surface can be more effectively reduced.

In the image display apparatus according to the second aspect of the invention, it is preferable that the polarization converter and the light diffusion section are disposed on the optical path between the light modulator and the projected surface, and at least the light diffusion section is disposed in the position where the laser light that exits from the light modulator forms an intermediate image.

In the image display apparatus according to the second aspect of the invention, the laser light modulated by the light modulator, for example, undergoes polarization direction conversion in the areas of the polarization converter and diffusion in the light diffusion section. Since the light diffusion section is disposed in the position where an intermediate image is formed, the intermediate image is diffused by the light diffusion section and projected on the projected surface. Speckle noise in the image projected on the projected surface can therefore be more reliably reduced.

In the image display apparatus according to the second aspect of the invention, it is preferable that an intermediate image forming optical system is disposed on the optical path between the light modulator and the light diffusion section, and the intermediate image forming optical system forms the intermediate image.

In the image display apparatus according to the second aspect of the invention, the laser light modulated by the light modulator is focused by the intermediate image forming optical system to form an intermediate image, which is then diffused by the light diffusion section. Since the laser light to be projected on the projected surface has different polarization directions that correspond to the areas of the polarization converter, speckle noise in the image projected on the projected surface can be reduced.

Using the intermediate image forming optical system to form an intermediate image allows the intermediate image to be more reliably formed on the light diffusion section, whereby speckle noise in the image projected on the projected surface can be more reliably reduced.

In the image display apparatus according to the second aspect of the invention, it is preferable that the polarization converter and the light diffusion section are disposed on the optical path between the light source and the light modulator, and the light modulator is a reflective light modulator.

In the image display apparatus according to the second aspect of the invention, since the polarization converter and the light diffusion section are disposed on the optical path between the light source and the light modulator, for example, laser light beams having different polarization directions that correspond to the areas of the polarization converter are diffused by the diffusion member and incident on the light modulator. The diffused laser light beams having different polarization directions are then projected on the projected surface. Since laser light beams having different polarization directions do not interfere with each other, speckle noise in the image projected on the projected surface can be reduced. That is, unlike a configuration in which the polarization converter and the light diffusion section are disposed on the optical path between the light modulator and the projected surface, no intermediate image needs to be formed in the second aspect of the invention, whereby the size of the overall apparatus can be reduced.

In the image display apparatus according to the second aspect of the invention, the polarization converter is preferably disposed in the position of an aperture stop or a pupil of the projection device.

In the image display apparatus according to the second aspect of the invention, since the polarization converter is disposed in the position of an aperture stop or a pupil of the projection device, it is possible to impart different types of polarization information to a variety of spatial frequencies. Speckle noise in an image projected on the projected surface can therefore be more greatly reduced.

In the image display apparatus according to the second aspect of the invention, it is preferable that the polarization converter is formed on one side of a base, and the light diffusion section is formed on the other side of the base that is opposite the one side.

In the image display apparatus according to the second aspect of the invention, since the polarization converter is formed on one side of a base, and the light diffusion section is formed on the other side of the base that is opposite the one side, the polarization converter and the light diffusion section can be formed in a single process. Further, since the light diffusion section and the polarization converter are formed in a single base, there is no interface between the light diffusion section and the polarization converter. It is thus possible to prevent generation of stray light, which would be otherwise generated when there is an interface, whereby the laser light emitted from the light source and then diffused will fall within a predetermined range.

In the image display apparatus according to the second aspect of the invention, the light diffusion section is preferably formed on the other side by causing two light beams to interfere.

In the image display apparatus according to the second aspect of the invention, since the light diffusion section is formed by causing two light beams to interfere, it is possible to control generation of higher-order diffracted light in the light diffusion section. That is, the efficiency in light usage can be improved by introducing two light beams to form the light diffusion section in which no unwanted higher-order diffracted light is generated.

In the image display apparatus according to the second aspect of the invention, the light diffusion section is preferably a diffraction element.

In the image display apparatus according to the second aspect of the invention, since the light diffusion section is a diffraction element, the diffusion angle of the laser light diffused in the light diffusion section falls within a predetermined range. The efficiency in laser light usage can thus be improved.

In the image display apparatus according to the second aspect of the invention, it is preferable that one of the polarization converter and the light diffusion section is disposed between the light source and the light modulator, and the other one of the polarization converter and the light diffusion section is disposed between the light modulator and the projected surface.

In the image display apparatus according to the second aspect of the invention, since the polarization converter and the light diffusion section are separately provided on the upstream and downstream sides of the light modulator, the degree of freedom in disposing the polarization converter and the light diffusion section is improved.

The image display apparatus according to the second aspect of the invention is preferably configured to have a transmissive liquid crystal element as the light modulator, the polarization converter disposed on the optical path between the liquid crystal element and the projected surface, and the light diffusion section disposed on the optical path between the light source and the liquid crystal element.

In the image display apparatus according to the second aspect of the invention, when the light modulator is a transmissive liquid crystal element, and the polarization converter and the light diffusion section are separately disposed on the upstream and downstream sides of the liquid crystal element, the polarization converter is disposed on the optical path between the liquid crystal element and the projected surface, and the light diffusion section is disposed on the optical path between the light source and the liquid crystal element. That is, when the light modulator is a liquid crystal element, a polarization member is used to direct laser light having a specific polarization direction to the light modulator. In this case, disposing the polarization converter on the downstream side of the liquid crystal element allows laser light beams having different polarization directions that correspond to the areas of the polarization converter to be efficiently projected on the projected surface.

In the image display apparatus according to the second aspect of the invention, it is preferable that the laser light emitted from the light source undergoes polarization direction conversion in the areas of the polarization converter, and the converted laser light then undergoes diffusion in the light diffusion section.

In the image display apparatus according to the second aspect of the invention, laser light undergoes polarization direction conversion in the areas of the polarization converter, and the converted laser light then undergoes diffusion in the light diffusion section. That is, since laser light beams having different polarization directions that correspond to the areas of the polarization converter are diffused, the laser light beams having different polarization directions are superimposed on the projected surface, whereby speckle noise in an image projected on the projected surface can be more effectively reduced.

In the image display apparatus according to the second aspect of the invention, the polarization converter is preferably made of a birefringent material in which there is a phase difference between an ordinary ray and an extraordinary ray.

In the image display apparatus according to the second aspect of the invention, since the polarization converter is made of a birefringent material in which there is a phase difference between an ordinary ray and an extraordinary ray, the polarization direction can be efficiently converted in the areas of the polarization converter.

In the image display apparatus according to the second aspect of the invention, $0 \leq Re \leq \lambda/2$ is preferably satisfied, where $\lambda$ represents the wavelength of the laser Light emitted from the laser light source, and Re represents the phase difference between the ordinary ray and the extraordinary ray.

In the image display apparatus according to the second aspect of the invention, since the polarization converter is made of a birefringent material in which the phase difference Re between the ordinary ray and the extraordinary ray satisfies $0 \leq Re \leq \lambda/2$, the polarization converter can output laser light beams having polarization directions that correspond to the areas of the polarization converter, whereby speckle noise can be reduced.

In the image display apparatus according to the second aspect of the invention, the depressions are preferably formed by sandblasting.

In the image display apparatus according to the second aspect of the invention, the depressions can be formed in a simple method by using sandblasting.

In the image display apparatus according to the second aspect of the invention, the depressions are preferably formed by photolithography and etching.

In the image display apparatus according to the second aspect of the invention, the depressions are formed in a simple method by using photolithography and etching. Changing the size and transmission of each aperture in a mask allows a depression having a desired size to be formed, whereby the depressions can be formed as designed, as compared to the sandblasting.

In the image display apparatus according to the second aspect of the invention, each of the plurality of areas is preferably sized to be smaller than an image formation area of the light modulator.

In the image display apparatus according to the second aspect of the invention, since each of the plurality of areas is sized to be smaller than the image formation area of the light modulator, an image that exits from the image formation area, when passing through the polarization converter, is divided into a plurality of areas having different polarization directions. Therefore, images having different polarization directions that correspond to the areas of the polarization converter are projected on the projected surface, whereby speckle noise can be reliably reduced.

In the image display apparatus according to the second aspect of the invention, each of the plurality of areas is preferably sized to be smaller than an aperture stop of the projection device.

In the image display apparatus according to the second aspect of the invention, since each of the plurality of areas is sized to be smaller than the aperture stop of the projection device, speckle noise can be reliably reduced.

A polarization conversion/diffusion member according to a third aspect of the invention includes a polarization converter having a plurality of areas that convert incident laser light into laser light beams having polarization directions that correspond to the plurality of areas and outputs the laser light beams, and a light diffusion section that diffuses incident laser light. The polarization converter is formed on one side of a base, and the light diffusion section is formed on the other side of the base that is opposite the one side. The light diffusion section is formed on the other side by causing two light beams to interfere.

In the polarization conversion/diffusion member according to the third aspect of the invention, since the light diffusion section is formed by causing two light beams to interfere, it is possible to control generation of higher-order diffracted light in the light diffusion section. That is, the efficiency in light usage can be improved by introducing two light beams to form a diffusion layer in which no unwanted higher-order diffracted light is generated.

A polarization conversion/diffusion member according to a fourth aspect of the invention includes a polarization converter having a plurality of areas that convert incident laser light into laser light beams having polarization directions that correspond to the plurality of areas and outputs the laser light beams, and a light diffusion section that diffuses incident laser light. The polarization converter is formed on one side of a base, and the light diffusion section is formed on the other side of the base that is opposite the one side. The light diffusion section is a diffraction element.

The polarization conversion/diffusion member according to the fourth aspect of the invention is configured to have the polarization converter formed on one side of a base, the light diffusion section formed on the other side of the base that is opposite the one side, and a diffraction element as the light diffusion section. In such a configuration, the diffusion angle of the laser light diffused in the light diffusion section falls within a predetermined range, whereby the efficiency in laser light usage can be improved.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Embodiments of an illuminator, an image display apparatus, and a diffusion member according to some aspects of the invention will be described below with reference to the drawings. In the following drawings, the scale of each member is changed as appropriate in order to show the member at a recognizable size.

First Embodiment

A first embodiment of a projector according to the invention will be described with reference to FIGS. 1 to 5.

The present embodiment will be described with reference to a projection-type projector that projects color light containing image information produced by a spatial light modulator on a screen through a projection system.

Figure 1:
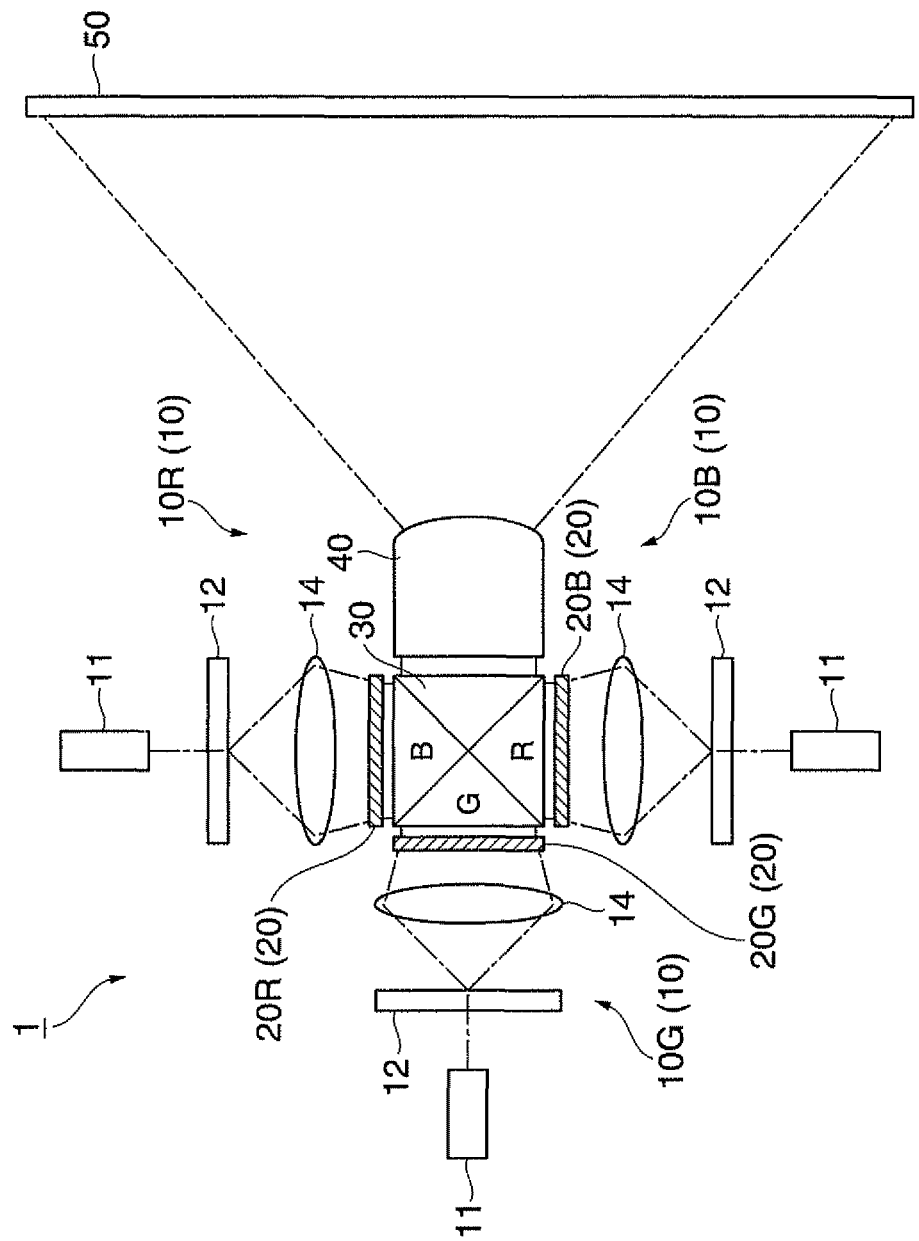
FIG. 1 is a plan view showing a projector according to a first embodiment of the invention.

In a projector (image display apparatus) 1 according to the present embodiment using a reflective screen (surface on which light is projected) 50, light containing image information is projected on the screen 50 from the front side thereof, as shown in FIG. 1.

The projector 1 includes a light source apparatus (laser light source) 10, a light modulator 20, a dichroic prism (color light combiner) 30, and a projection system (projection device) 40. In the following description, the light modulator is referred to as a liquid crystal light valve.

The light source apparatus 10 includes a red light source apparatus (laser light source) 10R that emits red laser light, a green light source apparatus (laser light source) 10G that emits green laser light, and a blue light source apparatus (laser light source) 10B that emits blue laser light.

The liquid crystal light valve (light modulator) 20 includes a two-dimensional transmissive red light modulator 20R that modulates laser light emitted from the red light source apparatus 10R in accordance with image information, a two-dimensional transmissive green light modulator 20G that modulates laser light emitted from the green light source apparatus 10G in accordance with image information, and a two-dimensional transmissive blue light modulator 20B that modulates laser light emitted from the blue light source apparatus 10B in accordance with image information. The dichroic prism 30 combines color light beams modulated by the light modulators 20R, 20G, and 20B.

The projection system 40 projects the laser light combined in the dichroic prism 30 on the screen (projected surface) 50.

Each of the light source apparatus 10R, 10G, and 10B includes a light source 11 that emits laser light, a diffraction optical element 12 that diffracts the laser light emitted from the light source 11, and an angle adjustment optical element 14 that adjusts the exit angle of the laser light diffracted by the diffraction optical element 12. The configuration of each of the light source apparatus 10R, 10G, and 10B is not limited to the one described above.

Figure 2:
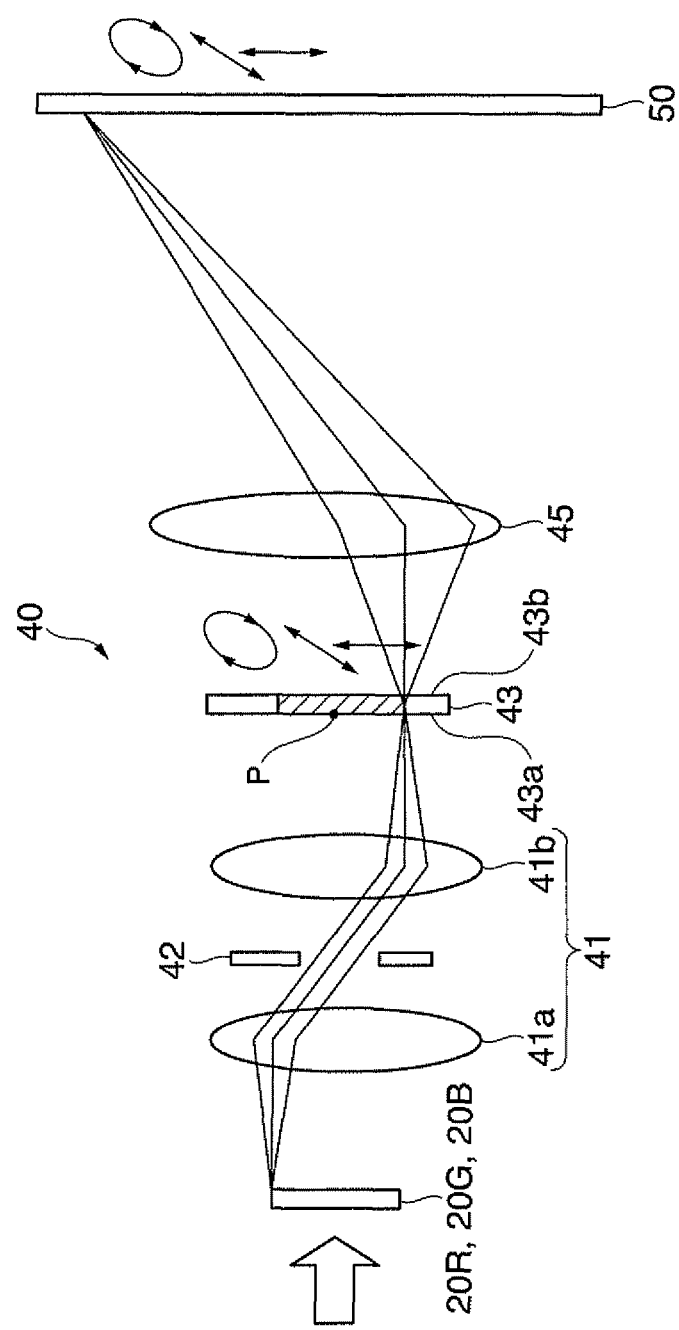
FIG. 2 is a plan view showing a projection system of the projector shown in FIG. 1.

The projection system 40 will be described with reference to FIG. 2. In FIG. 2, the liquid crystal light valves 20R, 20G, and 20B, the projection system 40, the screen 50 are linearly arranged and the dichroic prism 30 is omitted in order to clearly show an optical path diagram in which laser light incident on the liquid crystal light valves 20R, 20G, and 20B is projected on the screen 50.

The projection system 40 includes, as shown in FIG. 2, a first lens group 41, a polarization converter plate (polarization converter) 43, and a second lens group 45 disposed in this order along the optical path. The polarization converter plate 43 is rotated by an actuator (not shown) around an axis of rotation P, which is the center line of the polarization converter plate 43. The axis of rotation P coincides with the center line of the polarization converter plate 43 in the description, but the location of the axis of rotation P is not limited thereto. The axis of rotation P may be an end of the polarization converter plate 43.

The first lens group (intermediate image forming optical system) 41 focuses the laser light combined in the dichroic prism 30 to form an intermediate image on the polarization converter plate 43 or on a plane in the vicinity thereof. The first lens group 41 is a one-to-one magnification imaging lens including a front lens group 41a and a rear lens group 41b disposed substantially symmetrically with respect to an aperture stop 42. Each of the front lens group 41a and the rear lens group 41b desirably has bilateral telecentricity in consideration of viewing angle characteristics of the liquid crystal light valves 20R, 20G, and 20B. Each of the front lens group 41a and the rear lens group 41b includes a plurality of convex and concave lenses, and the shape and size of each of the lenses, the distances between the lenses, the number of the lenses, telecentricity, and magnification, and other lens characteristics are changed as appropriate in accordance with characteristic requirements of the lens group.

Figure 3:
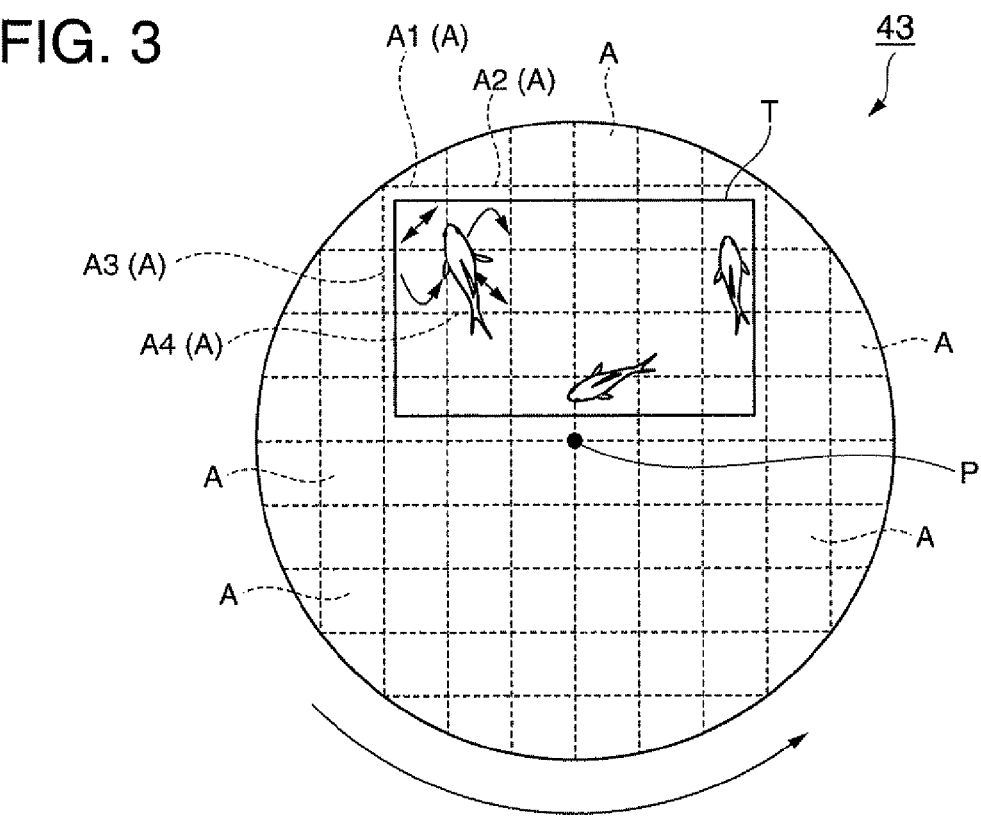
FIG. 3 is a front view showing a polarization conversion section of the projector shown in FIG. 1.

The polarization converter plate 43 has a plurality of areas A, and laser light beams that exit from the plurality of areas A have respective polarization directions, as shown in FIG. 3. That is, for example, the laser light beams that exit from a first area A1 and a fourth area A4 are linearly polarized in different oscillation directions, and the laser light beams that exit from a second area A2 and a third area A3 are elliptically polarized. The polarization directions of the laser light beams that exit from the plurality of areas A may be different from one another, or part of the polarization directions may be the same.

Further, the polarization converter plate 43 is disposed in the position where the first lens group 41 forms an intermediate image T, as shown in FIG. 3. Each of the areas A in the polarization converter plate 43 is sized to be smaller than the intermediate image T. Since the first lens group 41 is a one-to-one magnification imaging lens, the size of the image formation area of each of the liquid crystal light valves 20R, 20G, and 20B is substantially the same as the size of the intermediate image T. The size of each of the areas A in the polarization converter plate 43 is therefore smaller than the size of the image formation area of each of the liquid crystal light valves 20R, 20G, and 20B.

Each of the areas A in the polarization converter plate 43 may be sized to be smaller than the aperture stop 42.

While all the areas A in the polarization converter plate 43 are the same in size in the present embodiment, they may be different in size from one another, or part of the areas A may have a certain size and another part of them may have another size.

Figure 4:
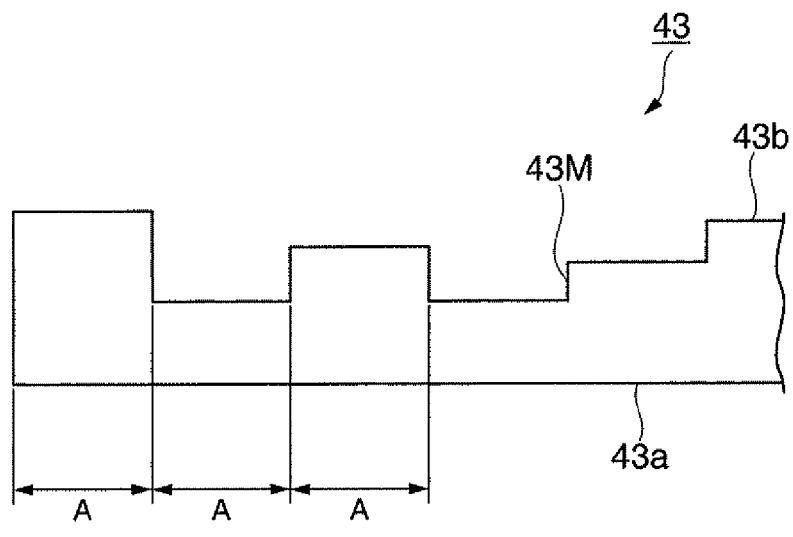
FIG. 4 is a plan view showing the polarization conversion section of the projector shown in FIG. 1.
Figure 4:
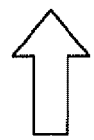

Specifically, the polarization converter plate 43 includes an incident end 43a on which the laser light combined in the dichroic prism 30 is incident and an exit end 43b, which is the side opposite the incident end 43a, having a plurality of rectangular depressions (a structure having protrusions and depressions) 43M having different depths, as shown in FIG. 4. The laser light that exits through the polarization converter plate 43 is thus diffused. One depression 43M corresponds to one area A shown in FIG. 3.

The polarization converter plate 43 is made of polycarbonate or other materials having a high photoelastic constant. Polycarbonate, when stretched and stressed, has two different refractive indices in the stretching direction and the direction substantially perpendicular thereto, and serve as a birefringent material having uniaxial optical anisotropy.

Figure 5:
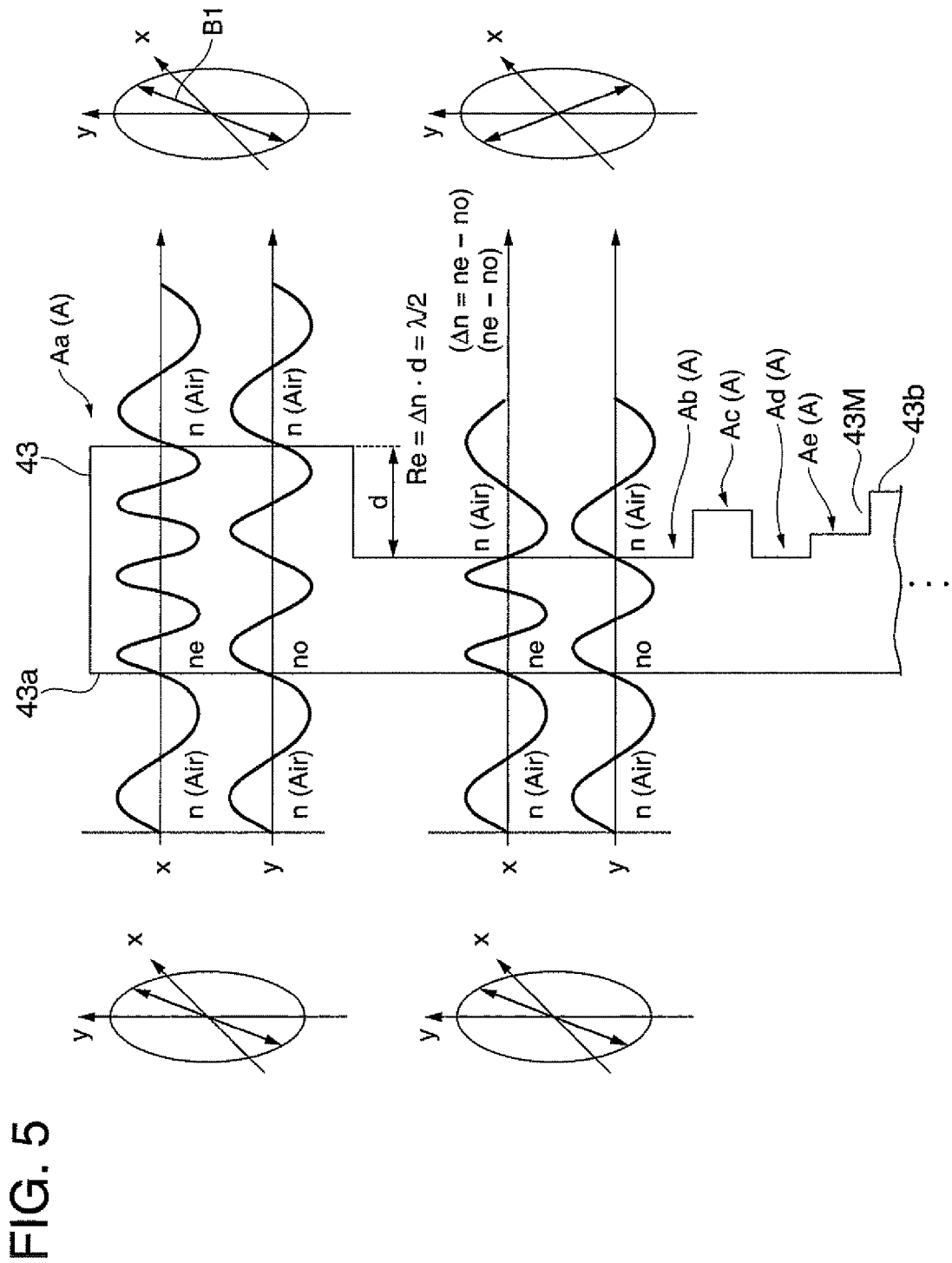
FIG. 5 is a descriptive diagram showing difference in polarization direction of laser light passing through the polarization conversion section of the projector shown in FIG. 1.

The polarization direction of the laser light passing through each of the areas A in the polarization converter plate 43 will be described with reference to FIG. 5. In FIG. 5, areas Aa and Ab are enlarged as compared to other areas Ac, Ad, Ae, . . . in order to clearly describe the polarization directions of the laser light beams that exit from the areas Aa and Ab. In practice, the laser light combined in the dichroic prism 30 is not incident on each of the areas A in the polarization converter plate 43, but is incident on the entire incident end 43a at once.

Now, let $C$ [$Pa^{-1}$] be the photoelastic constant of the material that forms the polarization converter plate 43, and $\sigma$ [pa] be the stress applied to the material when stretched. The difference in refractive index between the ordinary ray and the extraordinary ray is expressed as follows:

(1)

For a material having the refractive index difference $\Delta n$, the following relationship is satisfied:

(2)

where d represents the difference in thickness between adjacent areas A.

The difference in thickness d between adjacent areas A can therefore impart the phase difference Re between the ordinary ray and the extraordinary ray. The polarization direction of the laser light beam that has passed through an area A in the polarization converter plate 43 therefore differs from the polarization directions of the laser light beams that have passed through the other areas A.

When a linearly polarized light ray is incident on the polarization converter plate 43 made of a material having uniaxial optical anisotropy and the light ray is inclined by 45 degrees to the optic axis of the material of the polarization converter plate 43, the phase difference Re varies as the thickness difference d between adjacent areas A varies. That is, as shown in FIG. 5, the polarization direction of the light ray that exits from an area A on the exit end 43b of the polarization converter plate 43 differs from the polarization directions of the light rays that exit from the other areas A. For example, the exiting light that exits from the area Aa has the polarization direction indicated by the arrow B1, which is the same as the polarization direction of the incident light, because the ordinary ray and the extraordinary ray travel different optical distances but have the same phase. On the other hand, the exiting light that exits from the area Ab has the polarization direction rotated in terms of phase by 90 degrees from the polarization direction of the incident light as indicated by the arrow B2, because the ordinary ray and the extraordinary ray travel different optical distances and have different phases. The phase difference Re between arbitrary areas A ranging from 0 to $\lambda/2$ may be sufficient. Therefore, laser light beams having respective polarization directions according to the difference in thickness d between adjacent areas A in the polarization converter plate 43 exit from the plurality of areas Aa, Ab, Ac, . . . .

A description will be made of a method for displaying an image on the screen 50 by using the thus configured projector 1 of the present embodiment.

The red, green, and blue laser light emitted from the light source apparatus 10R, 10G, and 10B become uniform and enter the angle adjustment optical elements 14. The uniform red, green, and blue light that have exited from the angle adjustment optical elements 14 are incident on the liquid crystal light valves 20R, 20G, and 20B and combined in the dichroic prism 30.

The combined laser light is incident on the polarization converter plate 43 via the first lens group 41. The laser light, when incident on the polarization converter plate 43, is linearly polarized. The linearly polarized laser light then undergoes polarization direction conversion in the areas A in the polarization converter plate 43, and the laser light beams that have exited from the areas A are diffused at the exit end 43b. As a result, linearly polarized light beams having different respective polarization directions and elliptically polarized light beams having different ellipticities exit from the polarization converter plate 43. Images formed by the laser light beams having different polarization directions that correspond to the areas A are projected on the screen 50 through the second lens group 45. The laser light beams projected on the screen 50 also have different polarization directions that correspond to the areas A.

In the projector 1 according to the present embodiment, the laser light beams having respective polarization directions that have exited from the polarization converter plate 43 are diffused and projected on the screen 50. Since laser light beams having different polarization directions do not interfere with each other, speckle noise in an image projected on the screen 50 can be reduced.

Further, since the polarization converter plate 43 is disposed in the position where an intermediate image is formed, and hence the intermediate image T undergoes polarization direction conversion and diffusion in the areas A, speckle noise can be more reliably reduced. Moreover, since the first lens group 41 is used to form an intermediate image, the intermediate image T can be more reliably formed on the polarization converter plate 43.

Further, since the polarization converter plate 43 has the depressions 43M, which diffuse the laser light beams emitted from the light source apparatus 10R, 10G, and 10B, the size and the cost of the overall apparatus can be reduced.

Since the polarization converter plate 43 is made of polycarbonate having high birefringence, the phase difference Re between the ordinary ray and the extraordinary ray can be increased. A large phase difference Re reduces the chance of interference of the laser light projected on the screen 50, whereby speckle noise can be reduced.

That is, the projector 1 of the present embodiment allows speckle noise to be more reliably reduced.

An illuminator including a laser light source that emits laser light and the polarization converter plate 43 described above may also be provided. In this case, laser light beams that exit from the polarization converter plate 43 and have different polarization directions corresponding to the areas A are projected on a projected surface. The illuminator may also include a projection device that projects the laser light beams on the projected surface. Using such an illuminator in a laser machining apparatus or a laser exposure apparatus allows a projected surface to be irradiated with laser light with reduced speckle noise, whereby laser machining or laser exposure can be accurately performed.

In the present embodiment, the polarization converter plate 43 is made of polycarbonate, but the material of the polarization converter plate 43 is not limited thereto. It is however noted that the polarization converter plate 43 is preferably made of a material having high birefringence.

While the polarization converter plate 43 is rotated in the above description, the polarization converter plate 43 may not be rotated depending on the shape of the screen or other factors. Alternatively, the polarization converter plate 43 may be swung.

The above description has been made with reference to the case where the polarization converter plate 43 also serves as a diffuser, but the polarization converter plate 43 does not necessarily serve as a diffuser. A light diffusion section that diffuses laser light may be provided separately from the polarization converter plate 43. In such a configuration, the polarization converter plate 43 may be positioned close to the light diffusion section, or may be in contact therewith. When the polarization converter plate 43 and a light diffusion section are separately provided, at least the light diffusion section may be disposed in the position where an intermediate image is formed. Providing a light diffusion section allows laser light to be more reliably diffused, whereby speckle noise can be more greatly reduced.

While the exit end 43b of the polarization converter plate 43 has the depressions 43M formed therein, the incident end 43a may also have depressions formed therein.

While a transmissive liquid crystal light valve is used as the light modulator, a reflective liquid crystal light valve, a DMD (Digital Mirror Device), an LCOS (Liquid Crystal On Silicon) device may also be used.

Second Embodiment

A second embodiment according to the invention will be described with reference to FIG. 6. In the drawings of the embodiments described below, the same portions as those in the projector 1 according to the first embodiment described above have the same reference characters, and no description of those portions will be made.

A projector 60 according to the present embodiment is similar to the first embodiment but differs therefrom in that the same polarization converter plate 43 as that in the first embodiment is disposed on the optical path between a light source (laser light source) 61 and a reflective light valve 64.

Figure 6:
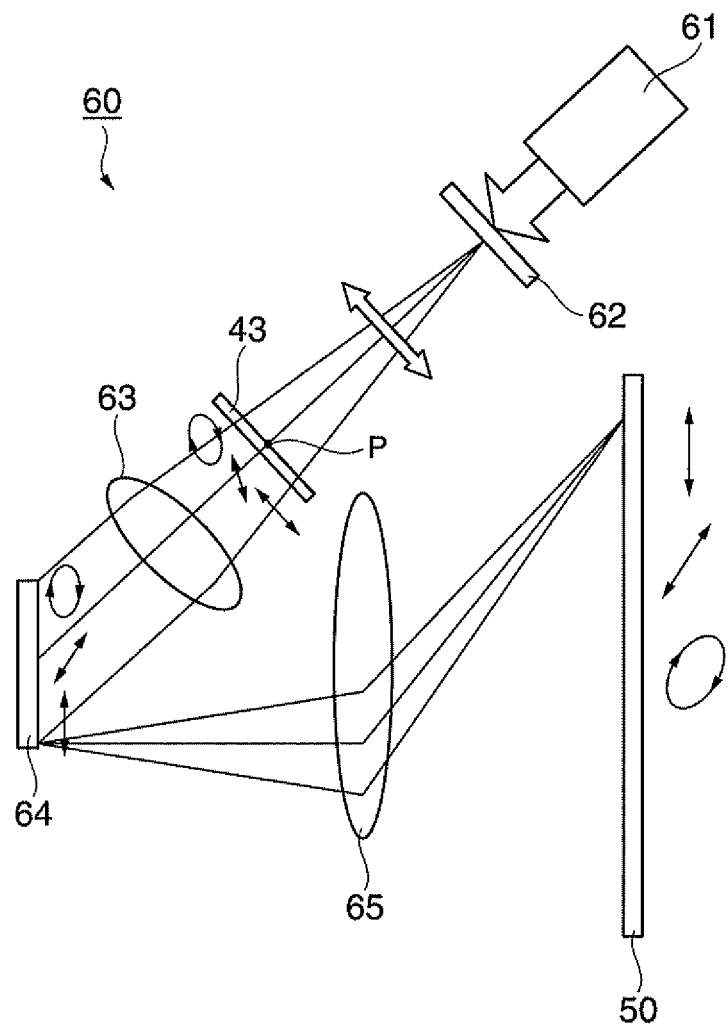
FIG. 6 is a plan view showing a projector according to a second embodiment of the invention.

The projector (image display apparatus) 60 includes, as shown in FIG. 6, a light source 61, a hologram element 62, a polarization converter plate (polarization converter) 43, a parallelizing lens 63, a reflective light valve (reflective light modulator) 64, and a projection system (projection device) 65.

The light source 61 is an LD (Laser Diode) that emits laser light. The hologram element 62 converts the laser light emitted from the light source 61 into rectangular illumination light.

The polarization converter plate 43 differentiates the polarization directions of laser light incident on areas A from one another and diffuses the laser light, as in the first embodiment. The polarization converter plate 43 can be rotated around an axis of rotation P. Therefore, the laser light that has exited from the hologram element 62 passes through the polarization converter plate 43, and diffused laser light beams having respective polarization directions exit from the plurality of areas.

The parallelizing lens 63 substantially parallelizes the diffused laser light that has exited from the polarization converter plate 43 and directs the parallelized laser light to the reflective light valve 64.

The reflective light valve (light modulator) 64 modulates the parallelized laser light that has exited from the parallelizing lens 63 in accordance with an image signal. An example of the reflective light valve 64 may be a DMD (Digital Mirror Device).

The projection system 65 is comprised of a plurality of lenses and projects the image modulated in the reflective light valve 64 toward a screen 50.

A description will be made of a method for displaying an image on the screen 50 by using the thus configured projector 60 of the present embodiment.

The laser light emitted from the light source 61 is first converted by the hologram element 62 into rectangular laser light, which is incident on the polarization converter plate 43. The laser light, when incident on the polarization converter plate 43, is linearly polarized. The laser light then undergoes polarization direction conversion and diffusion in each area in the polarization converter plate 43. The resultant linearly polarized light beams having respective polarization directions and elliptically polarized light beams having different ellipticities are incident on the reflective light valve 64. The images formed by the laser light beams reflected off the reflective light valve 64 and having different polarization directions that correspond to the areas of the polarization converter plate 43 are projected through the projection system 65 on the screen 50. The laser light beams projected on the screen 50 also have different polarization directions that correspond to the areas of the polarization converter plate 43.

The projector 60 according to the present embodiment can provide the same advantageous effect as that provided in the projector 1 of the first embodiment. In the projector 60 according to the present embodiment, since the polarization converter plate 43 is disposed upstream of the reflective light valve 64, laser light beams having different polarization directions that correspond to the areas of the polarization converter plate 43 are diffused and incident on the reflective light valve 64. That is, unlike the first embodiment, no intermediate image needs to be formed in the present embodiment, whereby the size of the overall apparatus can be reduced.

The hologram element 62 is used as a device that illuminates the reflective light valve 64, but the illumination device is not limited to the hologram element 62. Any other device can be used as long as it can illuminate the reflective light valve 64.

A DMD is used as the light modulator, but the light modulator is not limited to a DMD. Any other light modulator can be used as long as it requires no polarizer.

To project a color image on the screen 50, red, green, and blue laser light sources are used as the light source 61. The red, green, and blue laser light beams are combined, for example, in a dichroic prism, and the combined laser light is directed to the hologram element 62. In this process, the RGB light sources are driven in a time-division manner. A color image can thus be projected on the screen 50.

Third Embodiment

A third embodiment according to the invention will be described with reference to FIG. 7.

A projector (image display apparatus) 70 according to the present embodiment differs from the second embodiment in that a polarization converter plate 51 and a light diffuser plate 52 are separately provided.

Figure 7:
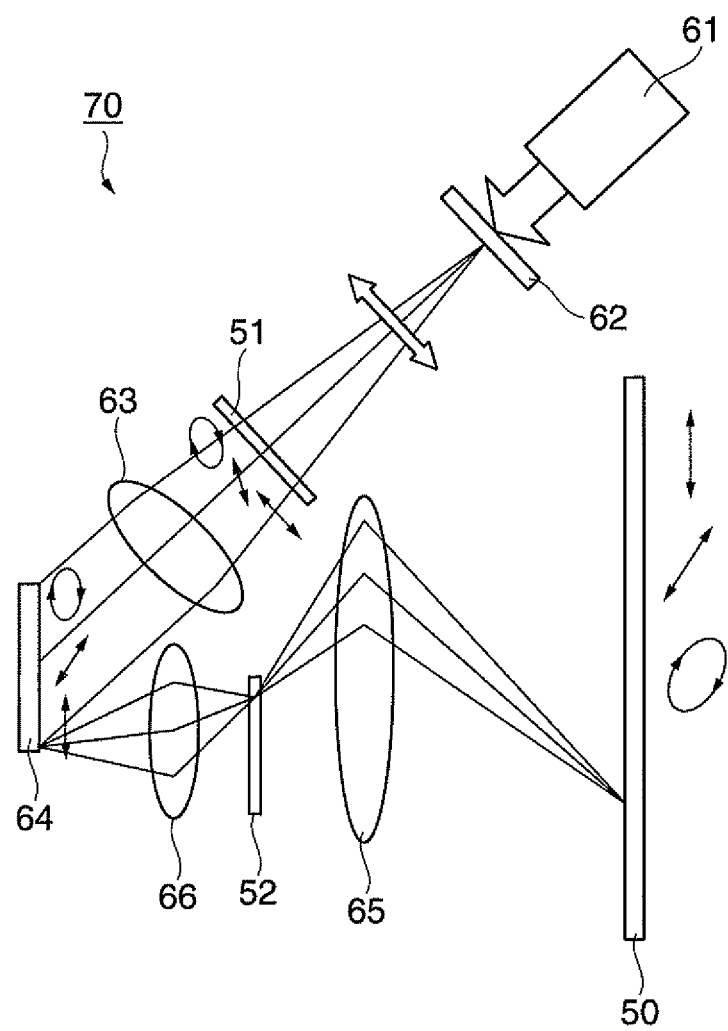
FIG. 7 is a plan view showing a projector according to a third embodiment of the invention.

The polarization converter plate (polarization converter) 51 is disposed on the optical path between the hologram element 62 and the parallelizing lens 63, as shown in FIG. 7. The polarization converter plate 51 is made of polycarbonate and differentiates the polarization directions of the laser light that has exited from the hologram element 62 and is then incident on areas of the polarization converter plate 51. The polarization converter plate 51 may be disposed anywhere on the optical path between the light source 61 and the reflective light valve 64.

The light diffuser plate (light diffusion section) 52 is disposed on the optical path between the reflective light valve 64 and the projection system 65. The light diffuser plate 52 is, for example, a glass plate having protrusions and depressions, diffuses the laser light that has exited from the reflective light valve 64, and directs the diffused laser light to the projection system 65. The light diffuser plate 52 is disposed in the position of an intermediate image of the reflective light valve 64. An intermediate image forming lens 66 that forms an intermediate image is provided between the reflective light valve 64 and the light diffuser plate 52.

In the projector 70 according to the present embodiment, since the light diffuser plate 52 is provided on the projection device 65 side of the reflective light valve 64, the light valve can be illuminated in such a way that the amount of light rays incident on the light valve is not reduced. In other words, illumination efficiency can be improved. Alternatively, the light diffuser plate 52 may be disposed on the optical path between the light source apparatus 61 and the reflective light valve 64, and the polarization converter plate 51 may be disposed on the optical path between the reflective light valve 64 and the screen 50.

Figure 8:
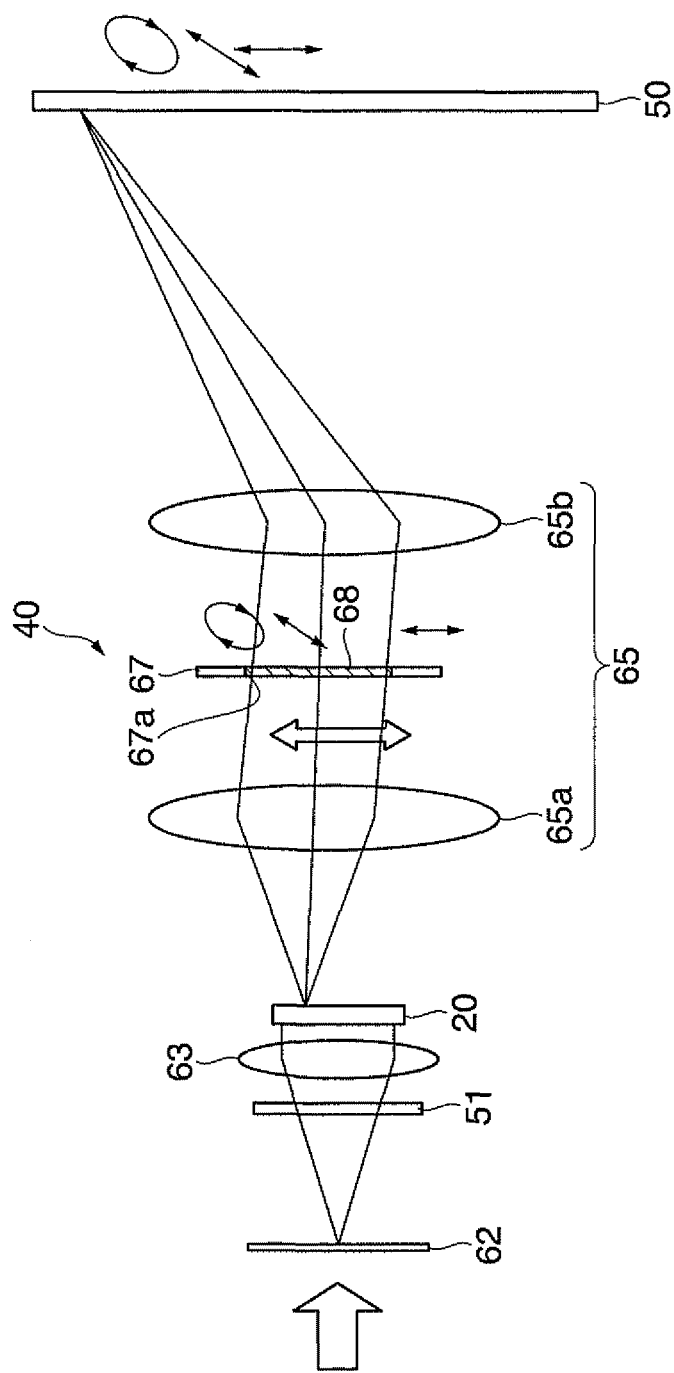
FIG. 8 is a plan view showing a variation of the projector according to the third embodiment of the invention.

As a more preferable form, the polarization converter plate is preferably disposed in the position of an aperture stop or a pupil of the projection system 65. Specifically, as shown in FIG. 8, the hologram element 62, the light diffuser plate 51, the parallelizing lens 63, the transmissive liquid crystal light valve 20 shown in the first embodiment, and the projection system 65 are sequentially disposed along the optical path of the light emitted from the light source 61. The projection system 65 includes a first lens group 65a and a second lens group 65b, and an aperture stop 67 is provided between the first lens group 65a and the second lens group 65b. A polarization conversion section 68 is provided in an aperture 67a of the aperture stop 67, and the polarization conversion section 68 differentiates the polarization directions of laser light incident on areas of the polarization conversion section 68 and outputs the resultant laser light.

Figure 9:
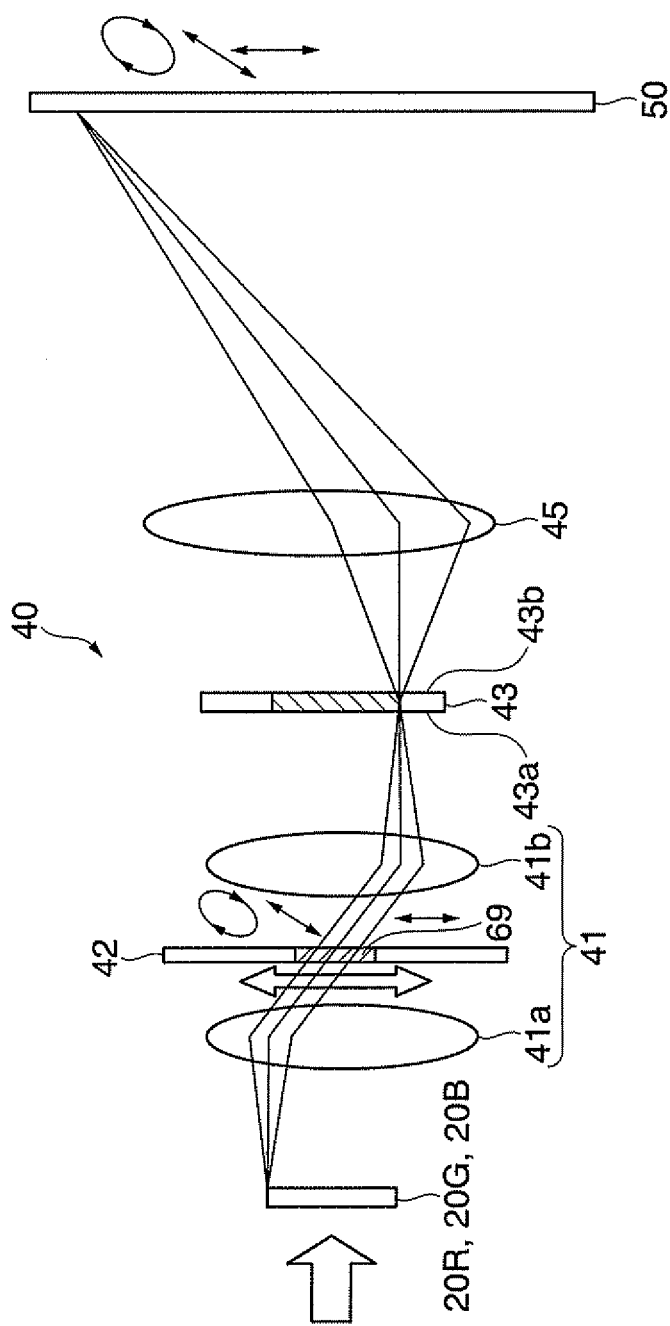
FIG. 9 is a plan view showing another variation of the projector according to the third embodiment of the invention.

As shown in FIG. 9, in a configuration in which an aperture stop 42 is provided between a front lens group 41a and a rear lens group 41b of a first lens group 41, as in the first embodiment, a polarization conversion section 69 may be provided in an aperture 42a of the aperture stop 42.

Figure 10:
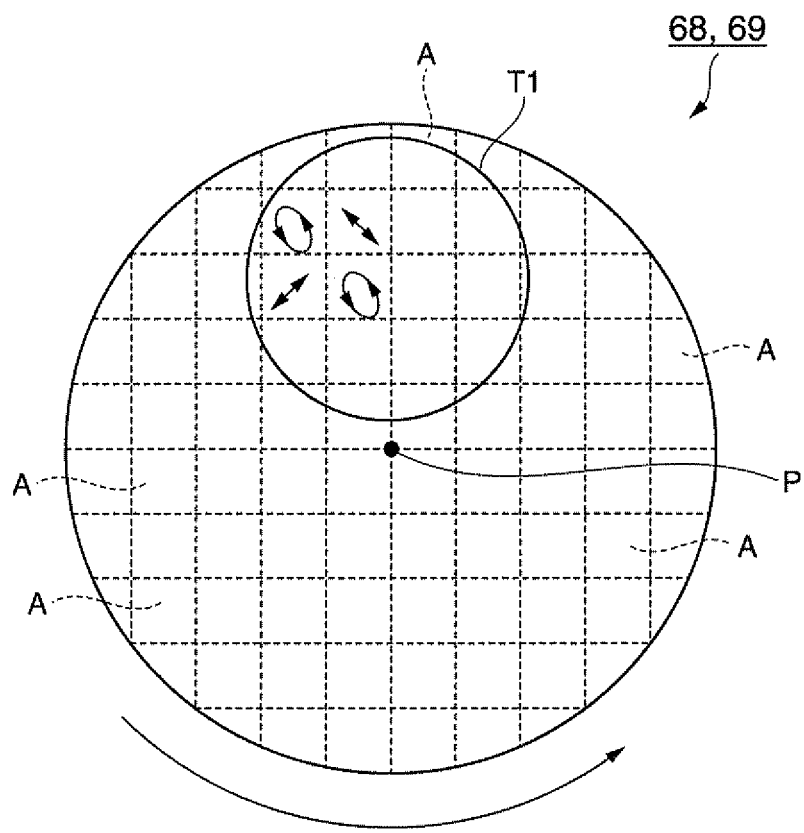
FIG. 10 is a front view showing a polarization conversion section of the projectors shown in FIGS. 8 and 9.

In the above configurations in which the polarization conversion sections 68 and 69 are provided in the position of the aperture stop 67 and 42, the relationship between the size of each area A and the size T1 of the aperture 67a and 42a of the aperture stop 67 and 42 is set, as shown in FIG. 10, in such a way that the size of one of a plurality of areas A is smaller than the size of the aperture 67a and 42a of the aperture stop 67 and 42.

The polarization conversion sections 68 and 69 are not necessarily provided in the apertures 67a and 42a of the aperture stops 67 and 42, but may be disposed in pupil positions thereof.

Further, the laser light emitted from the light source apparatus 61 is incident on the polarization converter plate 51 and the light diffuser plate 52 in this order. In this configuration, laser light beams having different polarization directions that correspond to the areas of the polarization converter plate 51 are diffused. The laser light beams having different polarization directions are therefore superimposed on the screen 50, whereby speckle noise can be more greatly reduced.

In the present embodiment, the polarization converter plate 51 and the light diffuser plate 52 are made of different materials, but the polarization converter plate 51 and the light diffuser plate 52 may be made of the same material.

Alternatively, the laser light that has exited from the first lens group 41 may be incident on the polarization converter plate 51 and the light diffuser plate 52 in this order. Still alternatively, the laser light that has exited from the first lens group 41 may be incident on the light diffuser plate 52 and the polarization converter plate 51 in this order.

When a transmissive liquid crystal light valve is used as the light modulator as in the first embodiment, and the polarization converter plate 51 and the light diffuser plate 52 are separately provided, the polarization converter plate 51 is disposed on the optical path between the liquid crystal light valves 20R, 20G, 20B and the screen 50, and the light diffuser plate 52 is disposed on the optical path between the light source apparatus 10 and the liquid crystal light valves 20R, 20G, 20B. That is, when the light modulators are the liquid crystal light valves 20R, 20G, and 20B, a polarization member is used to direct laser light having a specific polarization direction to the liquid crystal light valves 20R, 20G, and 20B. In this case, disposing the polarization converter plate 51 downstream of the liquid crystal light valves 20R, 20G, and 20B allows laser light beams having different polarization directions that correspond to the areas of the polarization converter plate 51 to be efficiently projected on the screen 50.

Fourth Embodiment

A fourth embodiment according to the invention will be described with reference to FIG. 11.

A projector according to the present embodiment is similar to the third embodiment but differs therefrom in that a polarization conversion section 73 and a light diffusion section 74 are integrally formed into a diffuser 71.

Figure 11:
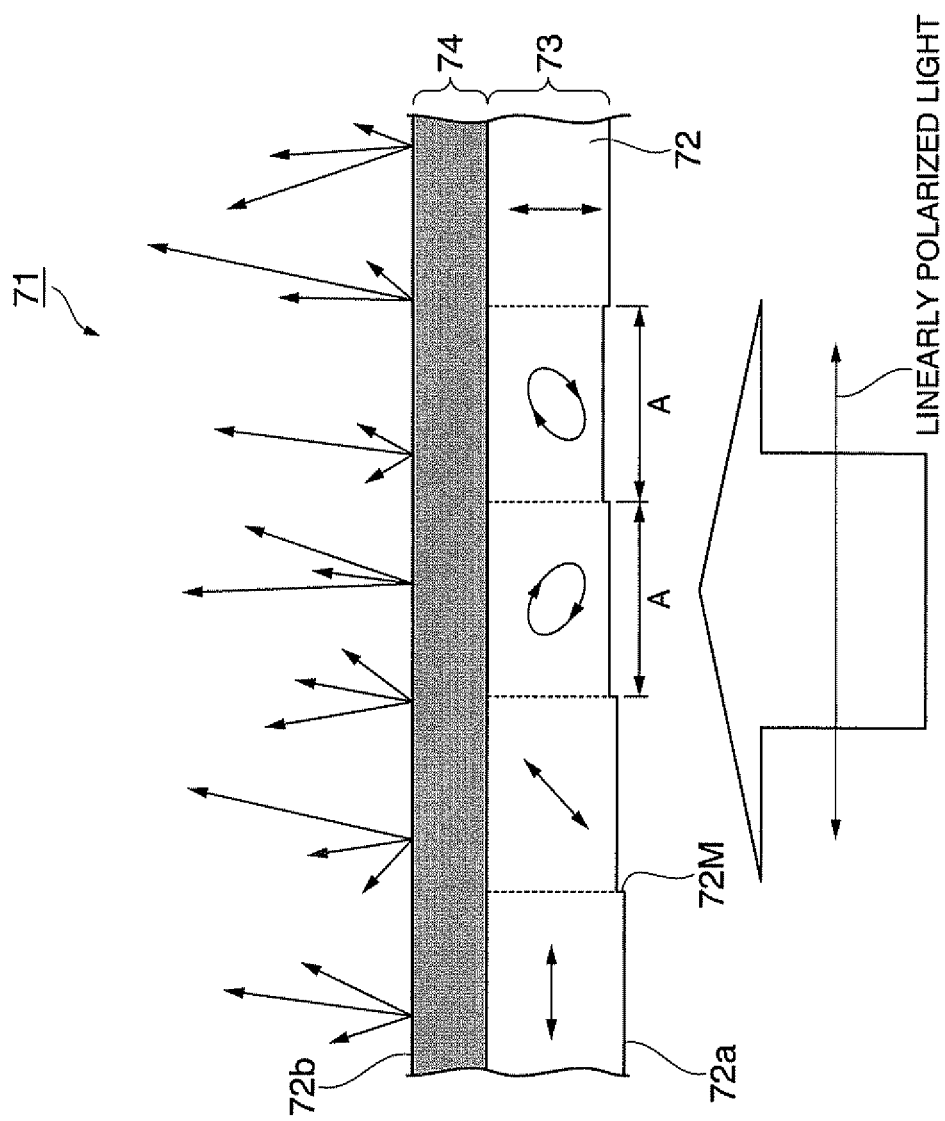
FIG. 11 is a plan view showing a polarization conversion/diffusion member according to a fourth embodiment of the invention.

The diffuser (polarization conversion/diffusion member) 71 is configured, as shown in FIG. 11, in such a way that the polarization conversion section 73 is formed on one side 72a of a base 72 made of polycarbonate and the light diffusion section 74 is formed on the other side 72b of the base 72 that is opposite the one side 72a. That is, the polarization conversion section 73 and the light diffusion section 74 in the present embodiment are made of the same material and integrated with each other. Laser light is incident on the one side 72a of the diffuser 71.

The polarization conversion section 73 has depressions 72M, as in the polarization conversion section 43 in the first embodiment shown in FIG. 5. The depressions 72M allow laser light beams having respective polarization directions to exit from a plurality of areas A.

The light diffusion section 74 is formed to have an arbitrary diffusion pattern by applying a photosensitive material onto the other side 72b of the polycarbonate base 72 and introducing two exposure beams in the photosensitive material to cause the beams to interfere.

The diffuser 71 of the present embodiment can control generation of diffracted light in the light diffusion section 74 formed by using two-beam interference. That is, the light diffusion section 74 formed by introducing two exposure beams prevents unwanted higher-order diffracted light from being produced, whereby the efficiency in light usage can be improved.

Further, since there is no interface between the polarization conversion section 73 and the light diffusion section 74, light that exits from the polarization conversion section 73 and enters the light diffusion section 74 will not be refracted when it travels from the polarization conversion section 73 to the light diffusion section 74. It is thus possible to prevent the laser light from being diffused toward the area outside the effective diameter of the following second lens group 45.

While the laser light is incident on the one side 72a of the base 72 in the above description, the laser light may be incident on the other side 72b.

Fifth Embodiment

A fifth embodiment according to the invention will be described with reference to FIG. 12.

A projector according to the present embodiment is similar to the third embodiment but differs therefrom in that a polarization conversion section 77 and a light diffusion section 78 are integrally formed into a diffuser 75.

Figure 12:
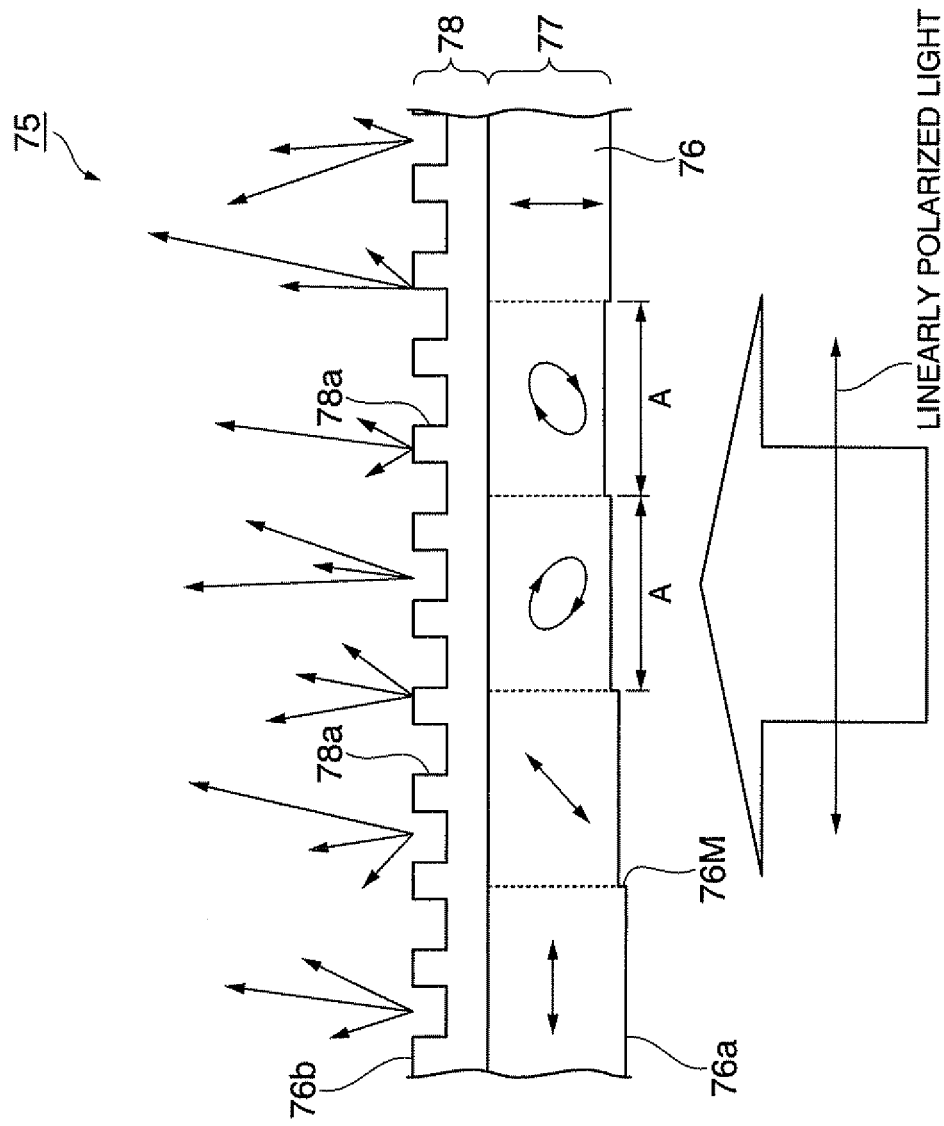
FIG. 12 is a plan view showing a polarization conversion/diffusion member according to a fifth embodiment of the invention.

The diffuser (polarization conversion/diffusion member) 75 is configured, as shown in FIG. 12, in such a way that the polarization conversion section 77 is formed on one side 76a of a base 76 made of polycarbonate and the light diffusion section 78 is formed on the other side 76b of the base 76 that is opposite the one side 76a. That is, the polarization conversion section 77 and the light diffusion section 78 of the present embodiment are made of the same material and integrated with each other. Laser light is incident on the one side 76a of the diffuser 75.

The polarization conversion section 77 has depressions 76M, as in the polarization conversion section 43 in the first embodiment shown in FIG. 5. The depressions 76M allow laser light beams having respective polarization directions to exit from a plurality of areas A.

The light diffusion section 78 is a surface-relief diffraction element having a plurality of grooves 78a arranged in a two-dimensional array.

In the diffuser 75 of the present embodiment, since there is no interface between the polarization conversion section 77 and the light diffusion section 78, as in the diffuser 71 of the fourth embodiment, no refraction occurs between the polarization conversion section 77 and the light diffusion section 78. It is thus possible to prevent the laser light from being diffused toward the area outside the effective diameter of the following second lens group 45.

Further, since the surface-relief diffraction element, which is the light diffusion section 78, is formed on the other side 76b of the base 76, the diffusion angle of the laser light diffused in the light diffusion section 78 falls within a predetermined range. The efficiency in laser light usage can thus be improved.

Sixth Embodiment

A sixth embodiment according to the invention will be described with reference to FIG. 13.

A description will be made of a method for forming a polarization converter plate in a projector according to the present embodiment by sandblasting. In the present embodiment, a polarization converter plate 80 has areas A having different sizes.

Figure 13:
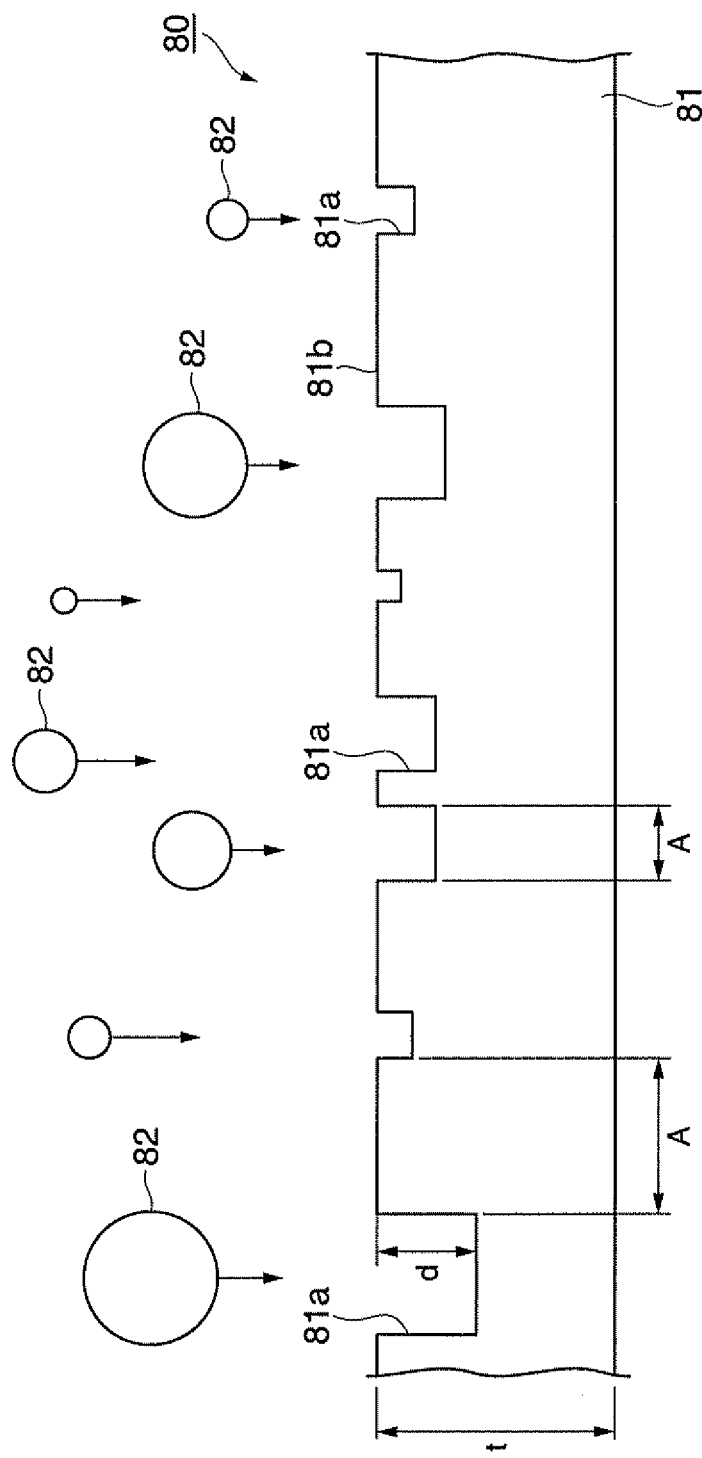
FIG. 13 is a plan view showing a method for forming a polarization conversion/diffusion member according to a sixth embodiment of the invention.

The polarization converter plate (polarization converter) 80 has a plurality of depressions 81a formed in a base 81 made of polycarbonate, as shown in FIG. 13. The thickness t of the base 81 satisfies $t > \lambda/(2 \times \Delta n)$, whereby a phase difference of $\lambda/2$ or greater can be obtained.

In a method for forming the depressions 81a, a surface 81b of the base 81 undergoes sandblasting in which sandblasting media 82 are sprayed to the surface 81 in such a way that the maximum difference in thickness d between adjacent areas A is a phase difference of $\lambda/2$, that is, the following equation is satisfied: $d(max) = Re(max)/\Delta n = \lambda/(2 \times \Delta n)$.

The depressions 81a can be formed in the base 81 in a simple method by using sandblasting to form the polarization converter plate 80.

Seventh Embodiment

A seventh embodiment according to the invention will be described with reference to FIG. 14.

A description will be made of a method for forming a polarization converter plate in a projector according to the present embodiment by photolithography and etching. In the present embodiment, a polarization converter plate 90 has areas A having different sizes.

Figure 14:
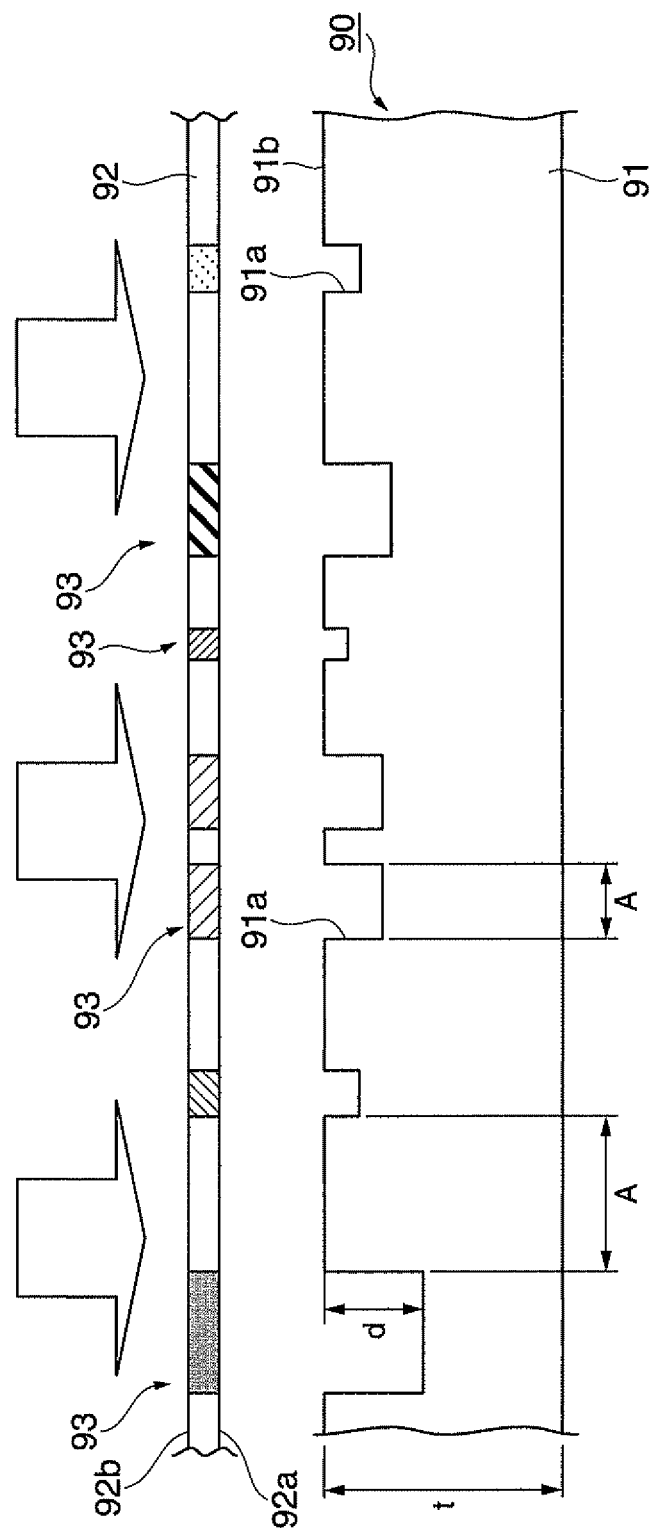
FIG. 14 is a plan view showing a method for forming a polarization conversion/diffusion member according to a seventh embodiment of the invention.

The polarization converter plate (polarization converter) 90 has a plurality of depressions 91a formed in a base 91 made of polycarbonate, as shown in FIG. 14. The thickness t of the base 91 satisfies $t > \lambda/(2 \times \Delta n)$, whereby a phase difference of $\lambda/2$ or greater can be obtained.

A method for forming the depressions 91a uses a mask 92 having areas A on a surface 91b of the base 91 whose aperture ratios (the sizes of apertures 93) and transmission values (the amounts of light rays passing through the apertures 93) are differentiated from one another in such a way that the maximum difference in thickness d between adjacent areas A is a phase difference of $\lambda/2$, that is, the following equation is satisfied: $d(max)=Re(max)/\Delta n=\lambda/(2\times\Delta n)$. A resist is applied onto the surface 91b of the base 91, and the resist is irradiated with light coming through a surface 92b of the mask 92 that is opposite a surface 92a that faces the base 91. The resist is thus patterned, followed by etching to form the depressions 91a.

In the present embodiment, changing the size and the transmission of each of the apertures 93 in the mask 92 allows the corresponding depression 91a to be formed to a desired depth. That is, as compared to the sandblasting used in the sixth embodiment, the base 91 can be processed as designed. Further, changing the sizes and the transmission values of the apertures 93 in the mask 92 also allows a more complicated pattern of the depressions 91a to be formed.

The etching may be either dry or wet etching. Further, using a transmission modulation mask (including surface area modulation) allows the amount of residual resist to be freely changed, whereby the etching depth can be freely changed. That is, it is readily possible to adjust the phase difference of a polarization converter plate 90 to a desired value.

Further, the mask 92 used in patterning the depressions 91a may be a metal mask for direct processing.

The technical extent of the invention is not limited to the embodiments described above, but a variety of changes can be made to the embodiments to the extent that such changes do not depart from the spirit of the invention.

For example, a dichroic prism is used as the color light combiner, but the color light combiner is not necessarily a dichroic prism. As the color light combiner, for example, dichroic mirrors may be disposed to be inclined to one another so that color light beams are combined, or dichroic mirrors are disposed to be parallel to one another so that color light beams are combined.

Further, a polarization conversion section used in an illuminator, such as a laser machining apparatus and a laser exposure apparatus, is not limited to the polarization conversion section in the first embodiment, but any of the polarization conversion sections and light diffusion sections in the second to seventh embodiments may be used.

Moreover, the illuminators in the above embodiments are applicable to what is called a slide projector in which no liquid crystal light valve is provided, but, for example, an illuminator illuminates a surface of a slide (positive film) containing image information to project light containing the image information onto a screen.

The entire disclosure of Japanese Patent Application No. 2007-330805, filed Dec. 21, 2007 is expressly incorporated by reference herein.

What is claimed is:

1. An image display apparatus that irradiates a projected surface comprising:
   a laser light source that emits laser light;
   a polarization converter disposed downstream of the laser light source, the polarization converter having a first area that converts the polarization direction of incident laser light into a first polarization direction and outputs the resultant laser light and a second area that converts the polarization direction of the incident laser light into a second polarization direction and outputs the resultant laser light;
   a light modulator disposed downstream of the laser light source, the light modulator modulating incident laser light in accordance with an image signal;
   a projection device disposed downstream of the light modulator, the projection device projecting incident laser light on the projected surface; and
   a light diffusion section disposed downstream of the laser light source, the light diffusion section diffusing incident laser light,
   wherein the polarization converter is disposed in the position of an aperture stop of the projection device.

2. The image display apparatus according to claim 1, wherein the light diffusion section is comprised of depressions formed in the polarization converter.

3. The image display apparatus according to claim 1, wherein the polarization converter and the light diffusion section are disposed on the optical path between the light modulator and the projected surface, and
at least the light diffusion section is disposed in the position where the laser light that exits from the light modulator forms an intermediate image.

4. The image display apparatus according to claim 3, wherein an intermediate image forming optical system is disposed on the optical path between the light modulator and the light diffusion section, and
the intermediate image forming optical system forms the intermediate image.

5. The image display apparatus according to claim 1, wherein the polarization converter is disposed downstream of the light source and the light modulator, and the light diffusion section is disposed on the optical path between the light source and the light modulator, and
the light modulator is a reflective light modulator.

6. The image display apparatus according to claim 1, wherein the polarization converter is formed on one side of a base, and the light diffusion section is formed on the other side of the base that is opposite the one side.

7. The image display apparatus according to claim 1, wherein one of the polarization converter and the light diffusion section is disposed between the light source and the light modulator, and the other one of the polarization converter and the light diffusion section is disposed between the light modulator and the projected surface.

8. The image display apparatus according to claim 7, wherein the light modulator is a transmissive liquid crystal element,
the polarization converter is disposed on the optical path between the liquid crystal element and the projected surface, and
the light diffusion section is disposed on the optical path between the light source and the liquid crystal element.

9. The image display apparatus according to claim 1, wherein the laser light emitted from the light source undergoes polarization direction conversion in the areas of the polarization converter, and the converted laser light then undergoes diffusion in the light diffusion section.

10. The image display apparatus according to claim 1, wherein the polarization converter is made of a birefringent material in which there is a phase difference between an ordinary ray and an extraordinary ray.

11. The image display apparatus according to claim 10, wherein $0 \leqq Re \leqq \lambda/2$ is satisfied, where $\lambda$ represents the wavelength of the laser light emitted from the laser light source, and Re represents the phase difference between the ordinary ray and the extraordinary ray.

12. The image display apparatus according to claim 1, wherein the first and second areas are sized to be smaller than an image formation area of the light modulator.

13. The image display apparatus according to claim 1, wherein the first and second areas are sized to be smaller than an aperture stop of the projection device.

14. The image display apparatus according to claim 1, wherein the polarization converter is rotated or swung.

15. The image display apparatus according to claim 1, the light diffusion section being directly disposed on the polarization converter.

16. The image display apparatus according to claim 1, wherein the light modulator is disposed downstream of the polarization converter, and the light diffusion section is disposed downstream of the light modulator.

17. The image display apparatus according to claim 16, wherein the light diffusion section is disposed in the optical path between the light modulator and the projection device.

* * * * *